United States Patent [19]

Daniek

[11] 4,418,014

[45] * Nov. 29, 1983

[54] PROCESS FOR THE MANUFACTURE OF SULPHUR WHICH CAN BE RECYCLED

[75] Inventor: Georg Daniek, Frankfurt am Main, Fed. Rep. of Germany

[73] Assignee: Cassella Aktiengesellschaft, Frankfurt am Main, Fed. Rep. of Germany

[*] Notice: The portion of the term of this patent subsequent to Jan. 5, 1999 has been disclaimed.

[21] Appl. No.: 393,538

[22] Filed: Jun. 30, 1982

Related U.S. Application Data

[63] Continuation of Ser. No. 268,127, May 28, 1981, abandoned, which is a continuation-in-part of Ser. No. 162,417, Jun. 6, 1980, Pat. No. 4,309,401.

[30] Foreign Application Priority Data

Jun. 2, 1980 [DE] Fed. Rep. of Germany ....... 2926528

[51] Int. Cl.$^3$ .................. C09B 49/00; C01B 17/06
[52] U.S. Cl. ................... 260/125; 423/567 A; 423/571; 423/577; 423/578 R; 8/652
[58] Field of Search ............. 423/567, 571, 577, 578; 8/652; 210/702, 917; 260/125

[56] References Cited

U.S. PATENT DOCUMENTS

| | | | |
|---|---|---|---|
| 2,877,177 | 3/1959 | Story | 8/652 |
| 4,092,105 | 5/1978 | Sullins | 210/917 |
| 4,309,401 | 1/1982 | Daniek | 423/571 |

*Primary Examiner*—Edward J. Meros
*Assistant Examiner*—Steven Capella
*Attorney, Agent, or Firm*—Connolly and Hutz

[57] ABSTRACT

The process for recovering recyclable sulphur from a strongly colored solution obtained from the production of sulphur dyestuffs containing alkali metal sulfides, alkali metal polysulfides, sulphur dyestuffs or mixtures thereof comprising
(a) mixing said solution at an alkaline pH with a decolorizing amount of an iron or zinc compound which is a hydroxide or the salt of an inorganic acid whereby a precipitate is formed,
(b) separating the precipitate to isolate a decolorized solution, and either
(c) precipitating elemental sulphur from the decolorized solution by adding sulphur dioxide or alkali metal thiosulfate under acidic conditions, and
(d) separating the precipitated elemental sulphur, or
(e) recycling the decolorized solution for use in the manufacture of sulphur dyestuffs.

7 Claims, No Drawings

PROCESS FOR THE MANUFACTURE OF SULPHUR WHICH CAN BE RECYCLED

This application is a continuation of Ser. No. 268,127, filed May 28, 1981, now abandoned, which in turn is a continuation-in-part of Ser. No. 162,417, filed June 6, 1980 now U.S. Pat No. 4,309,401.

The present invention relates to a process for the manufacture, from strongly coloured filtrates containing alkali metal sulphides and/or alkali metal polysulphides, especially filtrates from the manufacture of sulphur dyes, of sulphur which can be recycled.

Sulphur dyestuffs are obtained in a known manner by reacting suitable aromatic compounds with sodium sulphide, sodium polysulphide and/or elementary sulphur, either in the absence of solvents in the melt (baking process) or in the presence of organic or aqueous-organic solvents (reflux process). (See, for example, Dr. O. Lange; Die Schwefelfarbstoffe, ihre Herstellung und Verwendung ("The Sulphur Dyestuffs, their Preparation and Use"), Verlag Otto Spamer, Leipzig 1912).

In this reaction, varying quantities of sulphur enter into the active positions of the aromatic starting materials, rings containing sulphur being formed within molecules and sulphur bridges between molecules, especially sulphide and disulphide bridges, leading to a considerable enlargement of the molecule. The sulphur dyestuffs obtained in this way are converted into an alkali-soluble form by reductive cleavage of disulphide bridges and they can in this way be dyed onto cotton from an aqueous medium.

The sulphur dyestuffs have acquired a very great importance in industry and are, accordingly, manufactured on a large scale. A serious problem in the manufacture of sulphur dyestuffs is the working up or removal in an ecologically satisfactory manner of the filtrates produced, which are still strongly coloured, on isolating the sulphur dyestuffs which have been prepared. Depending on the nature of the sulphurisation process and the method of working up, these filtrates can contain, in addition to residual dyestuff, varying amounts of sodium sulphide, sodium polysulphide or sodium sulphate. Three different routes have been followed for working up the filtrates produced.

Thus, it is known to "blow out" the filtrates with air. In this process a powerful stream of air is blown into the filtrates for three to six hours. In this process, the oxygen of the air oxidises the polysulphide and the residual quantities of dyestuff present in the filtrates, and elementary sulphur precipitates, together with the residues of the sulphur dyestuff prepared. The sulphur sludge thus obtained is contaminated by dyestuff and is unsuitable for re-use for the manufacture of sulphur dyestuffs. The filtrates which are separated from the precipitated sulphur sludge contain a quantity of sodium thiosulphate equivalent to the original quantity of polysulphide. A further possible means consists in treating the polysulphide filtrates with sulphurous acid. In this process too, a sulphur which is strongly contaminated by dyestuff residues and which can no longer be employed for the manufacture of sulphur dyestuffs is obtained without exception. The reaction with sulphurous acid can be modified to the extent that the polysulphide filtrates are reacted with acid thiosulphate solutions. It is appropriate to use in this process, without further treatment, the thiosulphate-containing solutions which are obtained in isolating dyestuff from suspensions of sulphur dyestuff containing polysulphide by blowing out with air. Elementary sulphur is obtained in all these known processes for working up filtrates containing sodium sulphide and/or sodium polysulphide. However, the elementary sulphur is so strongly contaminated by the admixture of residual dyestuff that it can no longer be recycled, that is to say it is no longer suitable for the manufacture of sulphur dyestuffs, but must be taken to a dump.

It is also known (Chemiker-Zeitung/Chemische Apparatur/Verfahrenstechnik, 93rd year of publication—1969, No. 10, page 393) to precipitate sulphides and polysulphides from filtrates from the manufacture of sulphur dyestuffs, in the form of heavy metal sulphides by adding heavy metal ions, especially iron and zinc ions, in the form of salts or hydroxides. Here too, a quantity of free sulphur corresponding to the content of polysulphide is formed in addition to the precipitation of sulphide. In this method, the dyestuff present in the filtrates is likewise precipitated in the form of heavy metal dyestuff salts. The precipitate thus obtained is likewise unusable for recycling, since it contains, on the one hand, large quantities of heavy metals and likewise, on the other hand, the contaminating residual dyestuff. This process is particularly opportune in cases where major quantities of effluents containing heavy metals are produced in the same plant. The serious disadvantage of this process consists in the fact that, here too, it is necessary to dump the entire quantity of sulphur, together with residual dyestuff and heavy metal sulphides.

For working up effluents containing thiosulphate, it is known (Chemiker-Zeitung/Chemische Apparatur/-Verfahrenstechnik, 93rd year of publication 1969, No. 10, pages 394 and 395) to precipitate the dyestuff residues by adding relatively small quantities of heavy metal salts, in particular iron or zinc salts, to filter off the precipitate and to isolate the sulphur from the resulting, virtually dyestuff-free filtrate, by heating with acids. The sulphur thus obtained is suitable for re-use in the manufacture of sulphur dyestuffs. However, this process is not suitable for overcoming the problem of the filtrates containing sulphide and/or polysulphide and of the sulphur residues which are produced therefrom in large quantities by existing processes and which are contaminated with dyestuff.

It has now been found that sulphur suitable for re-use in the manufacture of sulphur dyestuffs (sulphur which can be recycled) can be obtained from strongly coloured filtrates from the manufacture of sulphur dyestuffs containing alkali metal sulphides and/or alkali metal polysulphide, if the filtrates are first decolorised by adding 0.003 to 0.06 kg per liter of filtrate, of iron or zinc hydroxides or an equivalent quantity of the corresponding salts of inorganic acids and are separated from the precipitate formed and if the sulphur is precipitated and removed from the decolorised filtrate in a known manner, for example by reaction with $SO_2$ or with thiosulphate solutions in the presence of acids.

It is surprising in this process that it is possible, by adding a relatively small quantity of heavy metal ions, to precipitate from the filtrates, virtually quantitatively, the dyestuff residues, which are also small in quantity, in the filtrates together with a very considerable stoichiometric excess of sulphides and polysulphides. The virtually dyestuff-free filtrates obtained by the process according to the invention can be worked up for elementary sulphur by the methods which are known in principle, that is to say by reaction with $SO_2$ or by reaction with thiosulphate in the presence of acids, such as sulphuric acid or hydrochloric acid. In every case a nearly dyestuff-free sulphur is obtained, which is produced in a readily separable form, that is to say it can be easily filtered or centrifuged or caused to settle out, and which is suitable once more for the manufacture of sulphur dyestuffs.

The quantity of iron or zinc hydroxide depends, of course, on the quantity of dyestuff to be precipitated. As a rule, the quantities of hydroxide indicated above are required. In the case of filtrates having substantially smaller or larger contents of residual dyestuff, it can be advisable to reduce further, or to increase, the quantity of iron or zinc hydroxide. The heavy metal hydroxides can be in the form of pourable suspensions or compact pastes or in a dried form, and they can be added in this form to the strongly coloured filtrates containing alkali metal sulphide and/or alkali metal polysulphide. If salts of the heavy metal with inorganic acids are used instead of the hydroxides, the water-soluble compounds, such as chlorides, sulphates or nitrates, are preferred. These are appropriately employed in the form of solutions. A particular advantage of the process consists, in this case, in the fact that, if appropriate, effluents from other sectors of manufacture can be employed as solutions of heavy metal salts. The heavy metal compound is generally added while stirring and the stirring is continued until a virtually colourless spread is obtained in a spot test on absorbent filter paper, the quantity of the heavy metal compound to be employed also being adjusted to achieve this result. The temperature at which the precipitation of dyestuff is carried out, is of minor importance and can, in principle, be between 0° C. and the boiling point of the filtrate, approximately 100° C. Within the range from 20° to 80° C. it is appropriate to carry out the process at the temperature at which the filtrates are produced. The pH value at which the precipitation is carried out, is similarly not critical as long as it remains within a strongly alkaline range, that is to say is between 9 and 14. It is preferable to carry out the process within the range from pH 10 to 12. After the dyestuff has been completely precipitated, which can be recognised by the virtually colourless spread in the spot test, the suspension is separated from its contained solids, appropriately filtration, sedimentation or centrifuging.

The precipitate which has been filtered off is small in quantity and can easily be dumped. The filtrate is clear and only slightly coloured and can be worked up for elementary sulphur by one of the customary known methods.

The process according to the invention offers considerable technical advantages for the whole process of manufacturing sulphur dyestuffs, since, on the one hand, it reduces the requirement for elementary sulphur appreciably and, on the other hand, renders it unnecessary to dump unusable sulphur residues.

The process is thus not only very valuable from the economic point of view, but is also a considerable enrichment of the art from the ecological point of view.

Furthermore, it has been found that the sulphur contained in the filtrates from the sulphur dyestuff production can be recycled for use in the production of sulphur dyestuffs without the necessity of reconverting it to its elemental form. In this operation, the initial steps are in exact accord with the process stated above.

This means that the strongly coloured solutions or waste effluents obtained from the sulphur dyestuff production, containing alkali metal sulfides, alkali metal polysulfides, sulphur dyestuffs or mixtures thereof are mixed at an alkaline pH with a decolorizing amount, especially 0.003 to 0.06 kilograms per liter solution, of an iron or zinc compound, which is a hydroxide or the salt of an inorganic acid, whereby a precipitate is formed and separating off the formed precipitate and obtaining a decolorized solution. This decolorized solution is used directly or after increasing its concentration as alkali metal polysulphide in the production of sulphur dyestuffs.

The decolorized solution contains the alkali metal polysulphide not used up in the thionation of dyestuffs, that is generally alkali metal polysulphide of the formula $Me_2S_x$, wherein Me is an alkali metal cation, especially sodium, and x is a number from 3.5 to 4. In the customary thionation batches a polysulphide solution is obtained which contains approx. 100 to 200 g of polysulphide per 1 liter.

The decolorized solution can be re-used for the manufacture of sulphur dyes instead of using an equivalent amount of pure polysulphide. In cases where the above concentration of the polysulphide is sufficiently strong to carry out the thionation reaction the solution can be employed without further treatment. In cases where a stronger concentration of the alkali metal polysulphide solution is required the concentration of the solution obtained is initially increased. This increase is achieved in that per liter of the solution 0.5 to 2 mols, preferably 1 to 1.5 mols, of $Me_2S$, especially $Na_2S$, and 1.25 to 7 mols, preferably 2.5 to 5 mols, of sulphur are added and in that the temperature of the solution is maintained at 50° to 100° C., preferably at 80° to 90° C., for 1 to 5 hours, appropriately with stirring. The $Me_2S$, especially $Na_2S$, can be added both in solid form and in the form of technical-grade aqueous solutions having in most cases a strength of 20 to 40 percent. If $Me_2S$, especially $Na_2S$, solutions are employed part of the water can be eliminated by distillation after the sulphur has completely dissolved in order to arrive at the polysulphide concentration desired. Instead of using a $Me_2S$, especially $Na_2S$, solution it is also possible to use a solution containing an equivalent mixture of MeHS and MeOH.

It is, of course, also possible to concentrate by evaporation the polysulphide solution generated after the clarification of the filtrates in order to arrive at the stronger concentration desired; as a rule, however, increasing the strength of the concentration of the solution by adding $Na_2S$ and sulphur as described above is more advantageous from an economical point of view.

Just as the process concerning the recovering of elemental sulphur, the process without recovering elemental sulphur offers considerable technical advantages in the manufacture of sulphur dyestuffs using the reflux process, since, on the one hand, it reduces the requirement for elemental sulphur appreciably and, on the other hand, renders it unnecessary to dump unusable sulphur residues.

The process is thus not only very valuable from the economic point of view, but is also a considerable enrichment of the art from the ecological point of view.

It is advantageous over the process concerning the recovering of elemental sulphur in that there is no need to reconvert the sulphur into its elemental form, which results in a further considerable reduction in procedural steps and thus in a reduction of costs.

EXAMPLE 1

(a) 50 ml of a 20% strength by weight solution of ferrous sulphate are added at 20°–25° C., while stirring, to 1 l of a filtrate from the manufacture of C.I. Vat Blue 43, which has a pH value of 11–11.4 and contains sodium sulphide as well as sodium polysulphide. During the addition, the progress of the precipitation of the dyestuff is followed by spot tests on absorbent filter paper. The spread, which at first is deeply coloured, becomes increasingly lighter as the precipitation of dyestuff proceeds. After the ferrous sulphate solution has been added, stirring is continued until the spread is virtually colourless (approximately 20–40 minutes) and the resulting suspension is then filtered through an alkali-resistant filter cloth.

The filter residue is washed free from polysulphide with a sodium chloride solution of 6° Bé, suction-drained until dry and discarded. The purified filtrate has a slight olive colouration and can be worked up for elementary sulphur by any desired known method.

A particularly advantageous method is the reaction with acid alkali metal thiosulphate solution, which can be carried out as follows:

(b) The filtrate obtained in accordance with paragraph (a) is diluted with 5 l of water. 400 ml of an aqueous solution containing 150–170 g/l of sodium thiosulphate (a previously purified filtrate from the manufacture of C.I. Sulphur Black 1) are initially placed in a 10 l stirred vessel and the pH is adjusted to 2–3 by adding a little 20% strength technical sulphuric acid. The diluted filtrate from paragraph (a) is then run into the acid thiosulphate solution in the course of 15–20 minutes, at 20°–25° C. and while stirring, 20% strength technical sulphuric acid (approximately 300 ml) being added at the same time in order to ensure that the pH value of the mixture does not rise above 2–3. When the addition is complete, stirring is continued for approximately 10 minutes and the pH value of the mixture is adjusted to pH 7–7.5 by adding 20% strength sodium hydroxide solution.

The sulphur which has been precipitated is filtered off, washed free from salts with water and dried.

It has a pale grey to slightly olive colouration, an analytical content of 96–98% of pure sulphur and is suitable for re-use in the manufacture of sulphur dyestuffs.

EXAMPLE 2

1 l of the filtrate from the manufacture of C.I. Vat Blue 43 is decolorized according to the details given in Example 1. The purified filtrate obtained having a slight olive coloration is further processed as follows:

1 liter of the solution obtained is stirred, at 80° to 90° C., with 175 g of a 35 percent strength by weight solution of sodium hydrogen sulphide, 80 g of sodium hydroxide solution of 50° Bé and 96 g of sulphur in a closed three-neck flask fitted with a reflux head until the sulphur has completely dissolved. Subsequently, the solution is concentrated in a rotary evaporator at a bath temperature of 75° to 80° C. and at 80 mbar until precipitation of the salt sets on, and is then filtered at 60° to 70° C. 450 ml of sodium tetrasulphide solution having a density of 1.450 are obtained, which can be used as sodium polysulphide solution in the production of sulphur dyestuffs according to the aqueous reflux process. When concentrating this solution by evaporation and drying the residue in a vacuum cabinet at 50 to 70 mbar and at 90° C. until a constant weight has been achieved, 345 g of solid sodium polysulphide can be obtained.

What is claimed is:

1. The process for recovering recyclable sulphur from a strongly colored solution from the sulphur dyestuff production containing alkali metal sulphides, alkali metal polysulphides, sulphur dyestuffs or mixtures thereof comprising
   (a) mixing said solution at an alkaline pH with a decolorizing amount of an iron or zinc compound which is a hydroxide or the salt of an inorganic acid whereby a precipitate is formed,
   (b) separating the precipitate to isolate a decolorized solution,
   (c) re-using the decolorized solution in the production of sulphur dyestuffs.
2. The process according to claim 1 wherein the amount of said iron or zinc compound is 0.003 to 0.06 kilograms per liter of solution.
3. The process according to claim 1 wherein the strongly colored solution is waste effluent from production of sulphur dyestuffs.
4. The process according to claim 1 wherein the iron or zinc compound is selected from the group consisting of chloride, sulfate and nitrate of iron or zinc.
5. The process according to claim 1 wherein the alkaline pH of step (a) is about pH 10 to 12.
6. The process according to claim 1 wherein the concentration of polysulphide is increased in the decolorized solution before its re-using in the production of sulphur-dyestuffs.
7. The process according to claim 6, wherein the polysulphide concentration of the decolorized solution is increased by adding 0.5 to 2 mols $Me_2S$, wherein Me is an alkali metal cation, or an equivalent amount of the mixture of MeHs and MeOH, and 1.27 to 7 mols sulphur and heating the solution to 50° to 100° C. for 1 to 5 hours.

* * * * *